Figure 1:
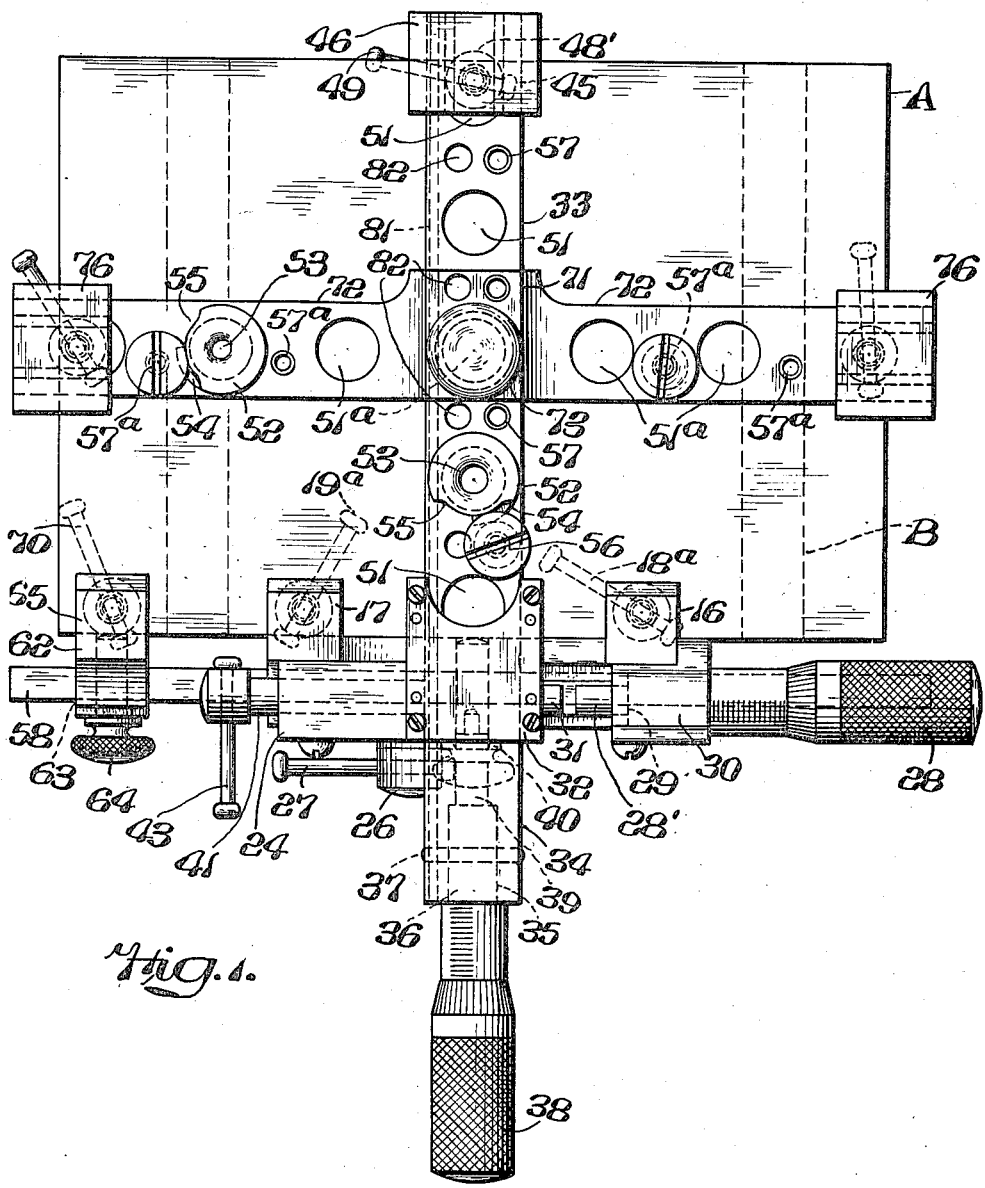

Feb. 15, 1944  A. BARABAS  2,342,033
INDEXING AND LAYOUT JIG
Filed Feb. 23, 1942  5 Sheets-Sheet 1

INVENTOR.
Alex Barabas
BY
ATTORNEY

Feb. 15, 1944.   A. BARABAS   2,342,033
INDEXING AND LAYOUT JIG
Filed Feb. 23, 1942   5 Sheets-Sheet 2
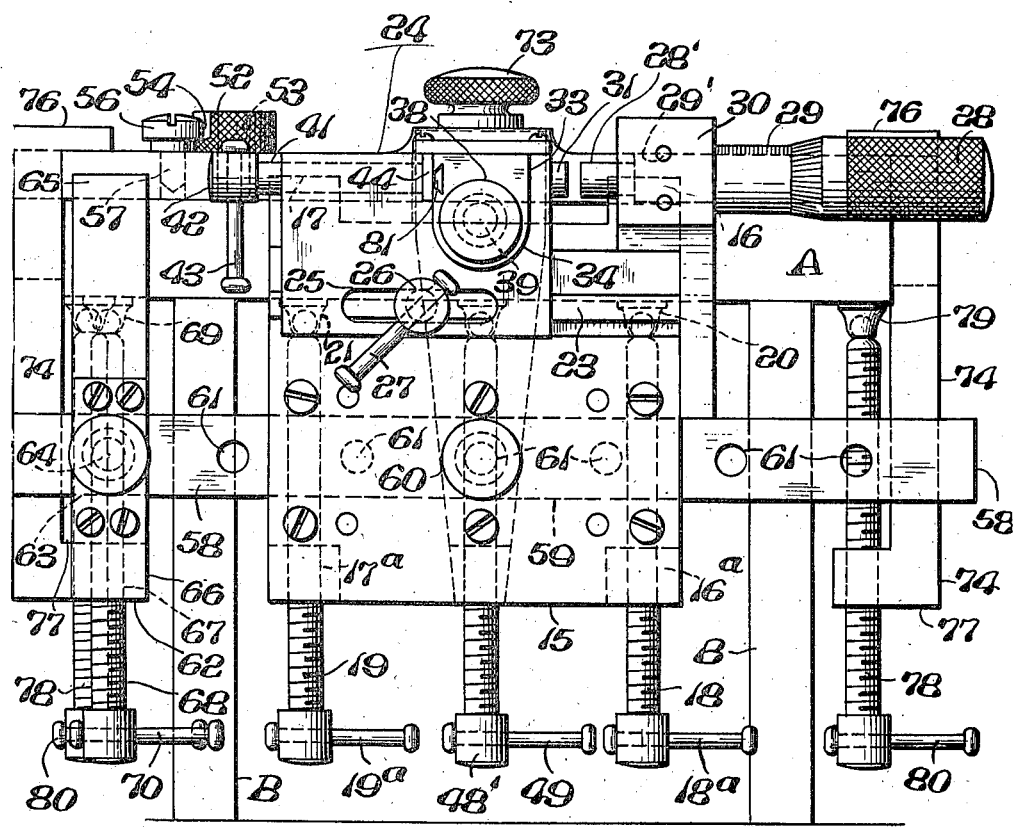
Fig. 2.
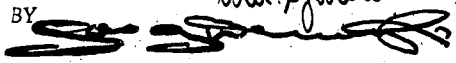

Feb. 15, 1944.  A. BARABAS  2,342,033
INDEXING AND LAYOUT JIG
Filed Feb. 23, 1942  5 Sheets-Sheet 3

INVENTOR.
BY Alex Barabas
ATTORNEY.

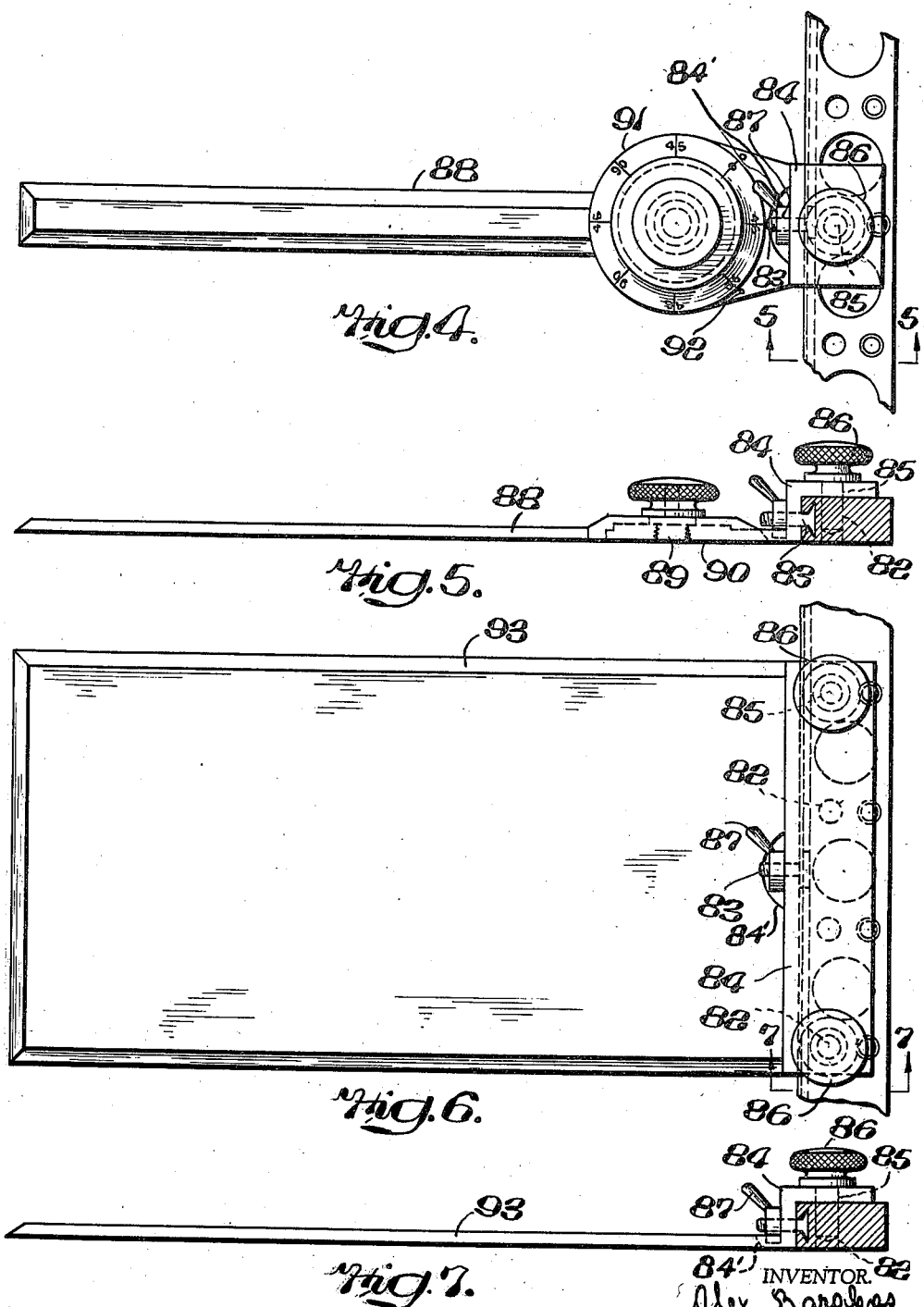

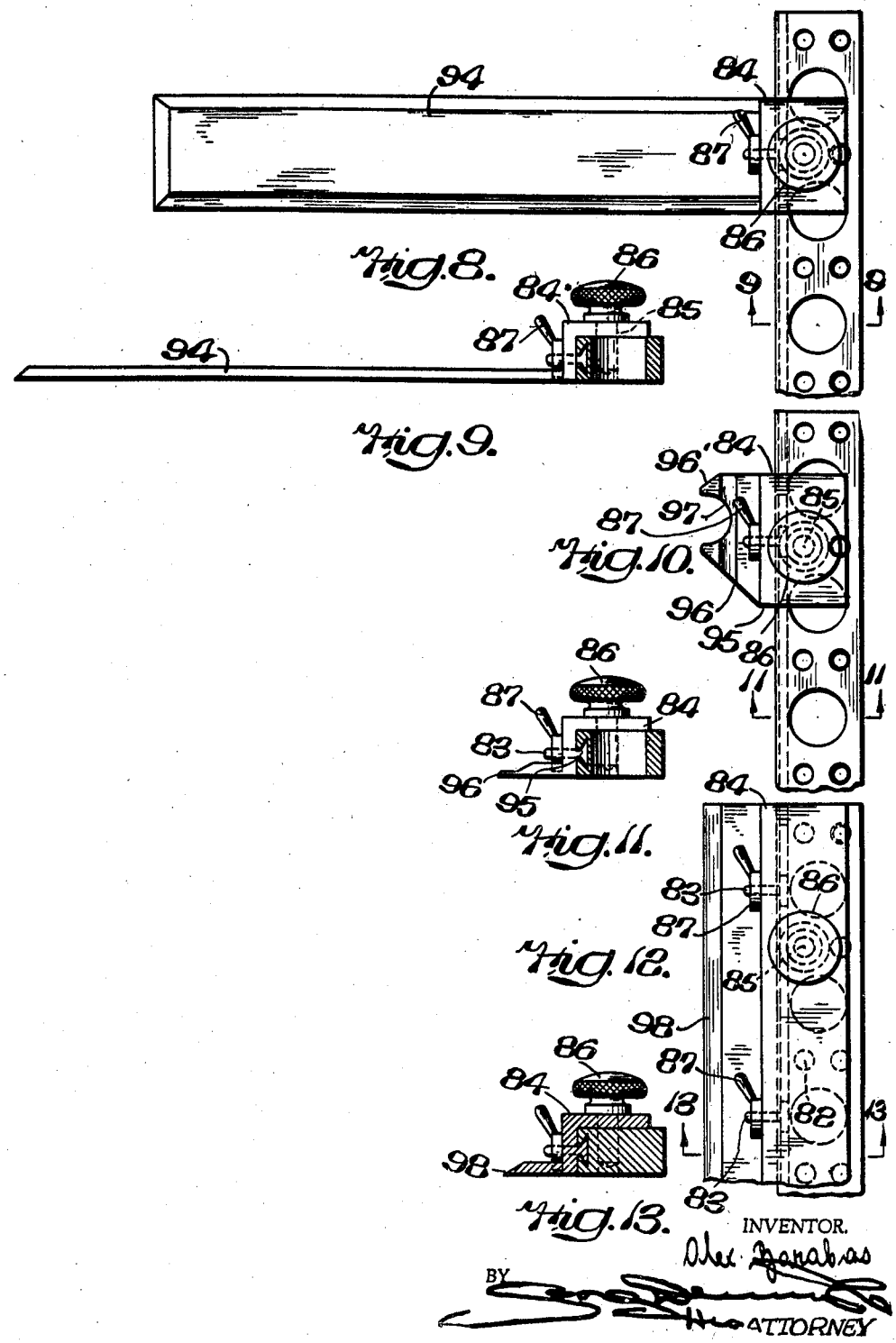

Patented Feb. 15, 1944

2,342,033

UNITED STATES PATENT OFFICE 2,342,033

INDEXING AND LAYOUT JIG

Alex Barabas, Philadelphia, Pa.

Application February 23, 1942, Serial No. 432,047

12 Claims. (Cl. 77—62)

My invention is an indexing and layout mechanism designed to facilitate the drilling at desired points of a work-piece, such as a die blank, and the scribing of contours thereon in accurately positioned relation to holes drilled in the work or to edges of the blank.

My improved mechanism comprises simple portable elements which may be readily assembled at, and clamped directly to, a work-piece so as to provide thereon quickly adjustable guides for a drill and scriber and permit the design required on the work-piece to be rapidly laid out with nicety and precision. The attachment of the elements of my mechanism directly to the work-piece permits plotting of work thereon accurately and without the usual tying up of drilling machines or other equipment incidental to the mounting of work on the bed of a drill press or other machine during the layout operations.

By my improvements, the positions of points to be initially drilled may be plotted while the work is out of the drilling machine; after which the work-piece with drill guides properly positioned thereon may be placed in a drilling machine and kept therein only during the time required for drilling. After the originally plotted holes have been drilled, the work, with its attached indexing elements, may be removed from the drilling machine or other equipment during further steps of plotting the contour and characteristics of the die to be formed from the work-piece. Not only may the drilling machine be released for other work during the time required for plotting, but the plotting may be done with greater facility.

In accordance with my invention, the indexing mechanism comprises a bracket, having C-clamps for attachment to a work-piece, and forming a support and slideway for a carriage which is movable along an edge of the work-piece by a micrometer mounted on the base. The carriage contains a slideway for a bar or slide, which is movable longitudinally over the work-piece, by a micrometer mounted on the carriage and is movable latitudinally over the work-piece by the movement of the carriage under control of the micrometer on the base. Clamps are provided by which the micrometrically adjusted slide and carriage may be securely locked in various positions on the carriage and base respectively.

An auxiliary base or bracket has a clamp for engaging the work-piece and provides a support for a guide permitting accurate shifting of the primary base relative to its initial or datum position when the capacity of the base micrometer is insufficient to move the carriage over a range requisite for the design to be laid out on the work-piece.

The longitudinally and latitudinally adjustable slide may be clamped to the work-piece, by a C-clamp having an apertured web, in any position to which the slide has been adjusted by the micrometers or by means of the auxiliary base. The slide preferably has a straight edge, which may be used as a scriber guide, along one edge thereof and has its other edge grooved to facilitate the attachment and adjustment of cursors having scriber guiding edges parallel to, transverse to, diagonal to or on a curve with respect to the edges of the slide.

The slide contains a series of equi-distantly spaced apertures forming seats for apertured bushings or drill guides. Preferably such bushings make close slip fits with their seats and have supporting flanges containing curved recesses and projecting lips complementary to the heads of locking screws threaded into apertures between the bushing seats.

The apertures forming the bushing seats may also be used as sockets for a pin for attaching to the slide a transverse cursor bar. This transverse cursor bar has a median aperture adapted to receive a pin and to register with a bushing seat in the slide, and also has laterally extending arms containing seats for apertured bushings or drill guides similar to those seated in the slide. The ends of the transverse cursor may be clamped to the work by C-clamps having apertured webs. When drill-guiding bushings are seated in the apertures of the transverse cursor, they may be held against axial or rotary movement by the heads of screws threaded into apertures in the cursor between the bushing seats similarly to the locking of the bushings to the slide.

Figure 3:
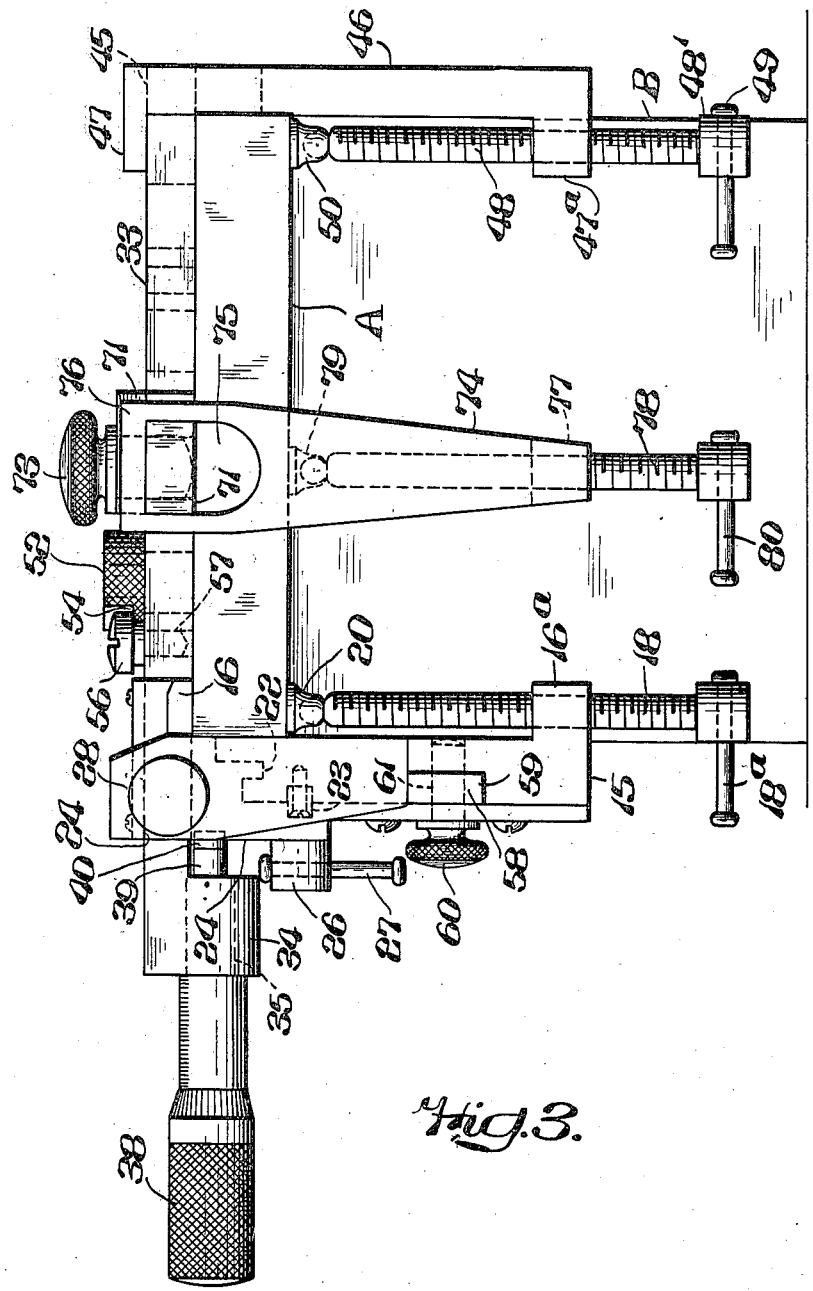

The characteristic features and advantages of my invention will further appear from the following description and the accompanying drawings in illustration thereof:

In the drawings, Fig. 1 is a top plan view of my improved indexing mechanism attached to a die blank; Fig. 2 is a front elevation of the mechanism shown in Fig. 1; Fig. 3 is a side elevation of the mechanism shown in Figs. 1 and 2; Fig. 4 is a fragmentary view of a portion of the indexing mechanism of Figs. 1, 2 and 3 with a supplementary attachment or cursor secured thereto; Fig. 5 is a side elevation of the mechanism shown in Fig. 4 partly sectioned along the line 5—5 of Fig. 4; Fig. 6 is a fragmentary view of a portion of the indexing mechanism of Figs. 1, 2 and 3 with an additional supplementary attachment or cursor secured thereto; Fig. 7 is a side elevation of the mechanism shown in Fig. 6 partly sectioned along the line 7—7 of Fig. 6; Fig. 8 is a fragmentary view of a portion of the indexing mechanism of Figs. 1, 2 and 3 with a further supplementary attachment or cursor secured thereto; Fig. 9 is a side elevation of the mechanism shown in Fig. 8 partly sectioned along the line 9—9 of Fig. 8; Fig. 10 is a fragmentary view of a portion of the indexing mechanism of Figs. 1, 2 and 3 with a further supplementary attachment or cursor secured thereto; Fig. 11 is a side elevation of the mechanism shown in Fig. 10 partly sectioned along the line 11—11 of Fig. 10; Fig. 12 is a fragmentary view of a portion of the indexing mechanism of Figs. 1, 2 and 3 with a further supplementary attachment or cursor secured thereto; and Fig. 13 is a side elevation of the mechanism shown in Fig. 12 partly sectioned along the line 13—13 of Fig. 12.

In Figures 1, 2 and 3, my improved indexing and layout jig is shown attached to a die blank, such as a steel block A, resting on work supports B of a drilling machine or other suitable base.

In the embodiment of my invention illustrated in the drawings, a bracket 15 has integrally formed thereon two pairs of parallel extensions or transverse jaws 16, 16a, 17, 17a. The extensions 16a and 17a have threaded therein threaded stems 18 and 19 respectively provided with transverse slide pins or handles 18a and 19a rectilineally movable through the heads of the stems 18 and 19 transverse to the axes of the latter. Clamping jaws 20 and 21 are connected, through ball and socket joints, with the upper ends of the stems 18 and 19 and grip the under surface of the die block A when its edge is inserted beneath the jaws or extensions 16 and 17 and the stems 18 and 19 are rotated to feed the clamping jaws 20 and 21 upwardly or toward such extensions.

The upper edge 22 of the bracket 15 is grooved or rabbetted and a rib 23 is bolted to the upper portion of the front thereof to form a slideway for a carriage 24 having ribs and grooves complementary to the rabbetted edge 22 and rib 23. The carriage contains an elongated slot 25 for the passage of the shank of a clamp 26 which is threaded in the bracket 15 and has a flanged head rotatable by the handle rod 27 against the face of the carriage 24 to immovably hold the carriage after it has been adjusted in position along the slideway of the bracket 15.

The adjustment of the carriage 24 along its slideway may be effected by means of a conventional Brown & Sharpe micrometer 28 having its sleeve 29 secured by pins 29' in a cylindrical bearing 30 of the bracket 15. By rotating the knurled and calibrated head or thimble of the micrometer 28 on the calibrated sleeve 29, the movable spindle 28' of the micrometer may be advanced against the anvil 31 of the carriage 24 to move the latter a desired micrometric distance along the slideway of the bracket 15.

The carriage 24 contains a slideway 32, extending transversely to the direction of movement of such carriage 24, for a slide 33, having at one end thereof an enlarged head 34 containing an axial socket 35. The sleeve 36 of a standard type of Brown & Sharpe micrometer is secured in the socket 35 by a pin 37 and is provided with the usual knurled and graduated rotating head or thimble 38 for micrometrically moving the movable spindle 39 against an anvil 40 seated in the face of the carriage 24.

A threaded stem 41 is threaded in the carriage 24 and has at one end thereof an apertured head 42 containing a rectilineally movable handle or rod 43. The inner end of the stem 41 bears against a movable fillet or clamp block 44 (Fig. 2) at one side of the slideway 32; the fillet being movable by the stem into clamping engagement with the side of the slide 33.

The outer end of the slide 33 may be housed in a slideway 45 of a bracket 46 having parallel arms or jaws 47 and 47a. A threaded stem 48 is threaded in the arm 47a and has at one end thereof a slotted head 48' containing a rectilineally movable handle or rod 49 by which the stem may be turned to move a jaw 50 into engagement with the bottom surface of the die block A. The jaw 50 has a ball and socket connection with the stem 48.

The slide 33 contains a series of circular apertures 51 adapted to receive bushings 52 containing axial apertures of different diameters to form guides 53 (Fig. 1) for drills of different diameters. Curved segments of the flange of each bushing 52 are cut away so as to leave a lower lip 54 and an open passage 55 adjacent to such lip and parallel with the axis of the bushing. Screws 56, having enlarged heads, may be threaded into tapped apertures 57 offset from the center line of the slide 33 on both sides of each hole 51. The cut away portion 55 of each bushing is so contoured that it will slip axially past the periphery of the head of a screw 56 when the bushing and screw are in adjacent holes, and if the head of the screw 56 is sufficiently spaced from the top of the slide 33 the bushing may be turned in its socket 51 so as to move its lip 54 beneath the head of the screw 56 so as to prevent axial withdrawal of the bushing and prevent further clockwise rotation thereof after the abutment of the flange of the bushing against the periphery of the head of the screw.

The apertures 51 have their centers spaced a predetermined distance, for example an inch or centimeter, correlated with the calibrations on the thimble 38 and sleeve 36 of the micrometer, whose maximum range of adjustment encompasses and preferably equals the center to center distance between holes 51. The first of the holes 51 is preferably so positioned that its center coincides with the vertical plane of the inner surface of the body of the bracket 15 when the micrometer thimble 38 is in a datum position. Hence, by placing a bushing in an appropriate opening 51 and operating the micrometer thimble 38 to move the slide 33 longitudinally, any desired point for drilling widthwise of the block A may be accurately indexed and a drill guided thereto through the bushing aperture. A bushing having an aperture appropriate to the drill size will, of course, be selected and used.

The slide 33 may be micrometrically shifted latitudinally to index a point for drilling or plotting lengthwise of the die plate A by rotating the thimble 28 to move the spindle 28' against the anvil 31 of the carriage 24. When the normal range of measuring movement of this micrometer is insufficient to effect a latitudinal movement of desired extent of the carriage 24 and slide 33, the bracket 15 is shifted latitudinally to a new datum position. This shift may be accurately and expeditiously effected by inserting an apertured guide bar 58 in a slideway 59 of the bracket 15 so that a slidable pin 60 of the latter enters one of the equi-distant holes 61 of the bar 58. A bracket 62 is provided with a slideway 63 and a slidable pin 64 by which the bracket 62 may be positioned along the bar 58 in an accurate predetermined relationship to the bracket 15 by inserting the pin 64 in a hole 61. The bracket 62 has an inturned upper jaw 65 adapted to engage the top of the die block A and a projection 66 parallel with the jaw 65 contains a threaded aperture 67 for a screw 68. The screw 68 is connected through a ball and socket joint with a jaw 69 at one end thereof and is provided with a sliding handle 70 at the opposite end thereof. The members 62, 65, 66, 68, 69 and 70 form a species of C-clamp which is readily attachable to the die block A in predetermined relationship to the bracket 15. The latter may then be moved a predetermined distance from its original datum position by turning the screws 18 and 19 to loosen the jaws 20 and 21 and withdrawing the pin 60 from the hole 61 in which it was originally seated. The bracket 15 may then be slid along the bar 58 until the pin 60 registers with a desired hole 61 of the bar 58. By then inserting the pin 60 in such other hole 61 the bracket 15 is accurately positioned and may be securely clamped to the die block A by tightening up the screws 18 and 19. To facilitate the indexing of points having a desired relationship to one another, I provide a cursor comprising a central housing 71 containing a slideway for the bar or slide 33 and having oppositely extending arms 72 which project at right angles from the bar 33 when the latter is engaged by the slideway of the housing 71. The housing 71 and arms 72 contain a series of apertures 51a of the same diameter and center to center spacing as the apertures 51 and also contains a series of apertures 57a similar to the apertures 57. The cursor is movable along the bar 33 to bring the aperture 51a in the housing 71 into registration with any desired aperture 51 and may be locked in such position by inserting a pin 73 into the registering apertures. The ends of the cross bars 72 may be securely anchored by the engagement therewith of C-clamps each comprising an apertured bracket 74 containing an aperture 75, for the reception of a cross-bar 72, and inturned parallel members 76 and 77. Each member 76 forms a jaw engaging a bar 72 and the face of the block A, and each member 77 contains a threaded aperture for a screw 78 having a clamping jaw 79 connected by a ball and socket joint with the one end thereof and having a sliding handle 80 at the other end thereof.

When the cross-bar 72 has been fixed in desired relative position to the bar or slide 33, a bushing 52, containing a drilling aperture 53 of any desired diameter, may be inserted in any desired apertures 51a and detachably held therein by a screw 56 threaded into an appropriate aperture 57a. By loosening the screws 18 as well as the screws 26, 41 and 48, the slide 33 and cross-arms 72 may be shifted as a unit by turning the thimbles 28 and 38 so as to maintain constant predetermined relationships between bushings 52 in apertures 51 and 51a while moving such drilling bushings together relatively to the edges of the die block A.

When indexing or scribing is to be done which does not involve stresses against a cursor such as are incident to drilling, there may be attached to the slide or bar 33 cursors such as are shown in Figs. 4 to 13 inclusive in addition to or in lieu of the drill-guiding and scriber-guiding cursor above described. To effect a ready attachment of such scriber-guiding cursors, an edge of the slide 33 is provided with an undercut or dove-tailed groove 81 and a row of apertures 82 are provided in the slide 33 along such groove 81. One or more bolts 83 having conoidal heads are slidable along the undercut groove 81 and have shanks projecting therefrom through apertures in L-shaped brackets 84 on scriber guides of any desired shape and construction. The brackets 84 contain apertures 85 adapted to register with the equi-distantly spaced apertures 82 in the slide 33, and a pin 86 may be inserted in registering apertures 85 and 82 to position a bracket 84 in predetermined relation to the center of any apertures 51. When the bracket 84 has been positioned by a slidable pin 85, it may be clamped in its adjusted position by a thumb nut 87 on the bolt 83. A clearance recess 84' provides clearance for the periphery of the nut.

In Figures 4 and 5, the scriber guide consists of a straight edge 88 which is pivotally connected by a threaded pin 89 with a base 90 attached to the bracket 84. The straight edge has a circular portion 91 suitably inscribed with an angle scale complementary to a datum mark 92 on the base 90. By adjusting the bracket 84 along the slide 33 and turning the straight edge 88 about its pivot, a line may be scribed in any desired angular relation to a point indexed by a bushing 51 or 51a.

As illustrated in Figures 6 and 7, the cursor comprises a beveled rectangular plate 93 connected directly to a L-shaped bracket 84 containing a plurality of apertures 85 adapted for registration with apertures 82 for the reception of pins 86 by which the plate 93 may be positioned and clamped in place by the nut 87.

As illustrated in Figures 8 and 9, the cursor comprises a narrow beveled plate or straight edge 94 fixed directly to a bracket 84 and through the pin 86 and nut 87 the plate may be secured in desired positions along the slide 33 and extending transversely thereto.

As illustrated in Figures 10 and 11, the cursor comprises a beveled plate 95 projecting from a bracket 84 and having an edge forming 45° angles 96 and 96' and a semi-circle 97.

As illustrated in Figures 12 and 13, the cursor comprises a straight edge 98 integrally formed on a bracket 84 and extending parallel with the edge of the slide 33 when the bracket 84 is positioned by the pin 86 in the registering holes 82 and 85 and clamped by the nuts 87 on the bolts 83.

It will be understood that when a block A has been selected of suitable size and shape for the formation of a die, the bracket 15 is clamped thereto in such relation to its edges that the slide 33 occupies a desired datum position when the micrometer thimbles 28 and 38 are in their datum positions.

By suitably loosening and tightening the clamp 46, adjusting the micrometer thimbles 28 and 38 and then inserting suitable bushings 52 in the apertures 51, requisite indexing of points to be drilled may be readily effected and the drilling performed directly through the apertures 53 in the bushings 52 by placing the block A with the indexing attachment thereon in a suitable drill press. Where the work to be performed is more complex than can be indexed by the use of the slide 33 alone, a suitable cursor or cursors 72, 88, 93, 94, 95 or 98 are appropriately attached to the slide 33 and may be moved therewith by turning the thimbles 28 and 38. When the movement of the thimble 28 does not provide sufficient latitudinal movement of the slide 33 to complete the indexing or scribing required by the die design, the unit may be shifted an accurately predetermined distance by means of the bar 53 and bracket 74 as hereinabove described.

Having described my invention, I claim:

1. A portable indexing and layout jig for attachment to a work-piece and comprising a base having work-engaging clamping means, a carriage movable on said base, a micrometer for positioning said carriage on said base, an apertured slide movable on said carriage transversely to the movement thereof, a micrometer for moving said slide transversely to the movement of said carriage, an apertured bushing seated in said apertured slide, and means for clamping said slide to the work-piece.

2. An indexing and layout mechanism comprising a base, means for attaching said base to a work-piece, a carriage micrometrically movable along said base, a slide on said carriage and micrometrically movable transversely to the movement of said carriage, a bracket having means for securing it to said work-piece independently of said base, a guide bar, and means for detachably connecting said guide bar with said base and bracket.

3. An indexing and layout mechanism comprising a base, a carriage movable on said base and containing a plurality of sockets for drilling bushings, means for micrometrically adjusting said carriage along said base, a clamp for securing said carriage to said base, a slide on said carriage and containing a plurality of sockets for drilling bushings, means for micrometrically moving said slide transversely to the direction of movement of said carriage, and a clamp for securing said slide against movement relative to said carriage.

4. An indexing and layout mechanism comprising a grooved and ribbed base, a carriage movable on said base and having a rib and groove complementary to the groove and rib of said base, a work-piece clamp on said base and including a jaw having a universal movement, a slide on said carriage, means for micrometrically adjusting said carriage on said base, and means for micrometrically adjusting said slide on said carriage.

5. An indexing and layout mechanism comprising a base having clamping means for engaging a work-piece, a carriage movable on said base, a slide mounted on said carriage and movable thereby over a work-piece engaged by said clamping means, a series of apertures in said slide, a cursor extending transversely to said slide, means for adjustably positioning said cursor on said slide, and clamping means for securing said slide and cursor to a work-piece engaged by said first named clamping means.

6. An indexing and layout mechanism containing an apertured slide, an apertured cursor extending transversely to said slide, means for adjustably positioning said cursor relatively to said slide, and clamping means for adjustably securing said slide and cursor to a work-piece.

7. An indexing and layout mechanism comprising a slide, means at one end of said slide for micrometrically moving it latitudinally and longitudinally, and means comprising a C-clamp having an apertured web for securing the other end of said slide to a work-piece.

8. An indexing and layout mechanism comprising a slide, a cursor extending transversely to said slide, means for adjustably securing together said cursor and slide, and means comprising C-clamps having slotted webs for securing said slide and cursor to a work-piece.

9. An indexing and layout mechanism comprising a rectilineally movable slide containing a plurality of sockets for drilling bushings and having a grooved edge parallel with the axes of said sockets and a cursor slidable along said grooved edge, and clamping mechanism for securing said cursor to said slide.

10. An indexing and layout mechanism comprising an apertured bar having a grooved edge, an apertured cursor movable along said grooved edge, a pin connecting said cursor and slide and seated in registering apertures thereof, and clamping means comprising a member engaged in said groove and projecting through an aperture in said cursor and a nut threaded on said projecting member.

11. An indexing and layout mechanism comprising an apertured slide, an apertured cursor movable along said slide, a pin seated in registering apertures of said slide and cursor, and an apertured bushing seated in an aperture of said slide.

12. An indexing and layout mechanism comprising a base having clamping mechanism for engaging a work-piece, a carriage movable along said base, an apertured slide mounted on said carriage, transversely disposed micrometers mounted respectively on said base and slide for engaging said carriage, clamps for securing said slide to said carriage and said carriage to said base, a flanged apertured bushing seated in an aperture of said slide, a screw seated in an aperture of said slide and having a head engaging a flange of said bushing, an apertured cursor containing a slideway for said slide and extending transversely thereto, and means comprising C-clamps having apertured webs for engaging the end of said slide and cursor and securing them to a work-piece.

ALEX BARABAS.